(12) United States Patent
Wu et al.

(10) Patent No.: US 9,706,434 B2
(45) Date of Patent: Jul. 11, 2017

(54) METHOD AND DEVICE FOR PROCESSING MESSAGE OVERLOAD

(71) Applicant: Huawei Technologies Co., Ltd., Shenzhen (CN)

(72) Inventors: Xiaobo Wu, Shenzhen (CN); Yali Guo, Shenzhen (CN); Zhipeng Fang, Shenzhen (CN); Qinghai Zeng, Shenzhen (CN); Wanqiang Zhang, Shenzhen (CN); Weihua Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 117 days.

(21) Appl. No.: 14/567,168

(22) Filed: Dec. 11, 2014

(65) Prior Publication Data
US 2015/0092547 A1 Apr. 2, 2015

Related U.S. Application Data

(63) Continuation of application No. PCT/CN2012/076934, filed on Jun. 14, 2012.

(51) Int. Cl.
*H04W 28/02* (2009.01)
*H04W 4/14* (2009.01)

(52) U.S. Cl.
CPC ......... *H04W 28/0289* (2013.01); *H04W 4/14* (2013.01)

(58) Field of Classification Search
CPC ....... H04W 4/14; H04W 84/045; H04W 8/26; H04W 68/005; H04L 12/5895
See application file for complete search history.

(56) References Cited

U.S. PATENT DOCUMENTS

2010/0120455 A1* 5/2010 Aghili ................ H04L 12/5895
                                                          455/466
2011/0191430 A1* 8/2011 Griot .................. H04L 12/5835
                                                          709/206

(Continued)

FOREIGN PATENT DOCUMENTS

CN          102006622 A      4/2011
CN          102333293 A      1/2012
WO     WO 2010142246 A1     12/2010

OTHER PUBLICATIONS

"3rd Generation Partnership Project; Technical Specification Group Core Network and Terminals; Non-Access-Stratum (NAS) functions related to Mobile Station (MS) in idle mode(Release 11)," 3GPP TS 23.122, V11.1.0, pp. 1-44, 3rd Generation Partnership Project, Valbonne, France (Dec. 2011).

(Continued)

*Primary Examiner* — Jung Park
(74) *Attorney, Agent, or Firm* — Leydig, Voit & Mayer, Ltd.

(57) ABSTRACT

Disclosed are a method and a device for processing message overload. The method comprises: a base station receiving a downlink NAS transmission message sent by a network device, the downlink NAS transmission message comprising indication information indicating whether to transmit an SMS; when being congested, the base station determining, according to the indication information, that the received downlink NAS transmission message is used to transmit an SMS; and processing the downlink NAS transmission message used for transmitting an SMS.

12 Claims, 5 Drawing Sheets

(56) References Cited

U.S. PATENT DOCUMENTS

| | | | | |
|---|---|---|---|---|
| 2011/0269457 | A1* | 11/2011 | Liu | H04W 8/06 455/433 |
| 2012/0002545 | A1* | 1/2012 | Watfa | H04W 48/06 370/235 |
| 2012/0115492 | A1* | 5/2012 | Liao | H04W 8/12 455/445 |
| 2012/0218889 | A1* | 8/2012 | Watfa | H04W 60/04 370/230 |
| 2014/0089442 | A1* | 3/2014 | Kim | H04W 76/02 709/206 |

OTHER PUBLICATIONS

"3$^{rd}$ Generation Partnership Project; Technical Specification Group Radio Access Network; Terminal logical test interface; Special conformance testing functions (Release 10)," 3GPP TS 34.109, V10.1.0, pp. 1-41, 3$^{rd}$ Generation Partnership Project, Valbonne, France (Dec. 2011).

"3$^{rd}$ Generation Partnership Project; Technical Specification Group Services and System Aspects; Service accessibility(Release 11)," 3GPP TS 22.011, V11.2.0, pp. 1-26, 3$^{rd}$ Generation Partnership Project, Valbonne, France (Dec. 2011).

"3$^{rd}$ Generation Partnership Project; Technical Specification Group Core Network and Terminals; Mobile radio interface signalling layer 3;General aspects(Release 10)," 3GPP TS 24.007, V10.0.0, pp. 1-149, 3$^{rd}$ Generation Partnership Project, Valbonne, France (Mar. 2011).

"3$^{rd}$ Generation Partnership Project; Technical Specification Group Core Network and Terminals; Non-Access-Stratum (NAS) protocol for Evolved Packet System (EPS); Stage 3 (Release 11)," 3GPP TS 24.301 V11.2.1, pp. 1-327, 3$^{rd}$ Generation Partnership Project, Valbonne, France (Mar. 2012).

"3$^{rd}$ Generation Partnership Project; Technical Specification Group Radio Access Network; Evolved Universal Terrestrial Radio Access (E-UTRA) and Evolved Packet Core (EPC); Special conformance testing functions for User Equipment (UE)(Release 9)," 3GPP TS 36.509, V9.5.0, pp. 1-39, 3$^{rd}$ Generation Partnership Project, Valbonne, France (Sep. 2011).

"3$^{rd}$ Generation Partnership Project; Technical Specification Group GSM/EDGE Radio Access Network; Individual equipment type requirements and interworking; Special conformance testing functions(Release 10)," 3GPP TS 44.014, V10.0.0, pp. 1-48, 3$^{rd}$ Generation Partnership Project, Valbonne, France (Mar. 2011).

"MT SMS transmission during SGSN/MME control of overload," SA WG2 Meeting #91, Kyoto, Japan, S2-122315, pp. 1-3, 3$^{rd}$ Generation Partnership Project, Valbonne, France (May 21-25, 2012).

"Load/Overload Control via MTC-IWF," SA WG2 Meeting #87, Jeju, Korea, S2-114674, pp. 1-5, 3$^{rd}$ Generation Partnership Project, Valbonne, France (Sep. 10-14, 2011).

* cited by examiner

METHOD AND DEVICE FOR PROCESSING MESSAGE OVERLOAD

CROSS-REFERENCE TO RELATED APPLICATIONS

This application is a continuation of International Patent Application No. PCT/CN2012/076934, filed on Jun. 14, 2012, which is hereby incorporated by reference in its entirety.

TECHNICAL FIELD

The invention relates to the technical field of communication, and in particular to a method and a device for processing message overload.

BACKGROUND

For an MTC (Machine Type Communication) system, in a case that an IP (Internet Protocol) address of UE (User Equipment) is unknowable or the UE is unreachable, an SCS (Services Capability Server) needs to inform the UE of executing an instruction of an application layer through DT (Device Triggering) and establish a communication between the UE and any one of the SCS (Services Capability Server) and an AS (Application Server). In conventional technology, an SMS (Short Message Service) is a main way of implementing DT.

For an LET (Long Term Evolution) network, DT is required to be implemented in a PS domain through the SMS for characteristic of PS (Packet Switching)-only. In the conventional LTE network, an NAS (Non-Access Stratum) message may be used to transmit the SMS, and the NAS message is carried on SRB (Signaling Radio Bearer) for transmission.

Besides being configured to transmit the SMS, the NAS message is also mainly configured to transmit control signaling between the UE and an MME (Mobile Management Entity). The SMS belongs to a non-real-time service, which may be selectively discarded. The control signaling has a high real-time performance and thus has a priority higher than that of the SMS, therefore, the control signaling usually should not be discarded. However, in the conventional technology, in a case that a base station is congested due to downlink transmission, the base station discards all NAS messages, which leads to a failure in normal call connection for the base station and affects services of the base station. In a case that the base station is congested due to uplink transmission, the base station can not receive other control signaling, which also affects services of the base station.

SUMMARY

A method and a device for processing message overload are provided according to embodiments of the invention, to address the problem in the conventional condition that normal call connection can not be achieved when the base station is congested, which affects services of the base station.

To address the above technical problem, following technical solutions are disclosed by embodiments of the present invention.

In an aspect, a method for processing message overload is provided, including:

receiving, by a base station, a downlink Non-Access Stratum NAS transmission message transmitted by a network device, where the downlink NAS transmission message includes indication information indicating whether to transmit an SMS;

determining, based on the indication information, that the received downlink NAS transmission message is configured to transmit the SMS, in a case that the base station is congested; and processing the downlink NAS transmission message configured to transmit the SMS.

In an aspect, another method for processing message overload is provided, including:

receiving, by UE, a first message transmitted by a base station when the base station is congested; and determining, based on the first message, whether to transmit an uplink NAS transmission message including an SMS to the base station.

In an aspect, a device for processing message overload is provided, including:

a receiving unit, configured to receive a downlink NAS transmission message transmitted by a network device, where the downlink NAS transmission message includes indication information indicating whether to transmit an SMS;

a determining unit, configured to determine, based on the indication information received by the receiving unit, that the received downlink NAS transmission message is configured to transmit the SMS, in a case that the base station is congested; and a processing unit, configured to process the downlink NAS transmission message configured to transmit the SMS and received by the receiving unit, after the determining unit determines that the received downlink NAS transmission message is configured to transmit the SMS.

In an aspect, another device for processing message overload is provided, including:

a receiving unit, configured to receive a first message transmitted by a base station when the base station is congested; and a processing unit, configured to determine, based on the first message received by the receiving unit, whether to transmit an uplink NAS transmission message including an SMS to the base station.

According to embodiments of the invention, for downlink transmission, the base station receives a downlink NAS transmission message including indication information indicating whether to transmit an SMS which is transmitted by a network device, and when the base station is congested, the downlink NAS transmission message configured to transmit the SMS is processed if it is determined, based on the indication information, that the received downlink NAS transmission message is configured to transmit the SMS. For uplink transmission, the UE receives a first message transmitted by the base station when the base station is congested, and determines whether to transmit an uplink NAS transmission message to the base station based on the first message. According to the embodiments of the invention, in a downlink transmission process, in a case that the base station is congested, the downlink NAS transmission message configured to transmit the SMS can be identified according to the indication information in the downlink NAS transmission message, to enable the base station to discard the downlink NAS transmission message or delay transmission of the downlink NAS transmission message, which relieves the congestion of the base station, therefore, the NAS transmission message configured to transmit control signaling can be transmitted normally and the base station can perform normal call connection, which ensures services of the base station. In an uplink transmission process, in a case that the base station is congested, the base station may inform a UE of its congestion information, to enable the UE to selectively discard or delay transmission of the uplink NAS transmission message including the SMS, which relieves the congestion of the base station, therefore, the base station can perform normal call connection and services of the base station are ensured.

BRIEF DESCRIPTION OF DRAWINGS

To describe the technical solutions of the embodiment of the invention or technical solutions in conventional technology more clearly, drawings involved in the embodiments of the invention are described briefly below. Apparently, the drawings described below are merely some embodiments, and persons of ordinary skill in the art can obtain other drawings according to these drawings without any creative effort.

DESCRIPTION OF EMBODIMENTS

To make the purpose, technical solutions and advantages of the invention more clearly, the invention is described in detail below in conjunction with appended drawings. Apparently, the described embodiments are merely a few rather than all of embodiments of the present invention. All other embodiments obtained by persons of ordinary skill in the art based on these embodiments of the present invention without creative efforts fall within the protection scope of the present invention.

A method and a device for processing message overload are provided according to following embodiments of the invention, with which whether an NAS message is configured to transmit an SMS or configured to transmit control signaling can be identified when a base station is congested, so as to ensure services of the base station.

Figure 1:
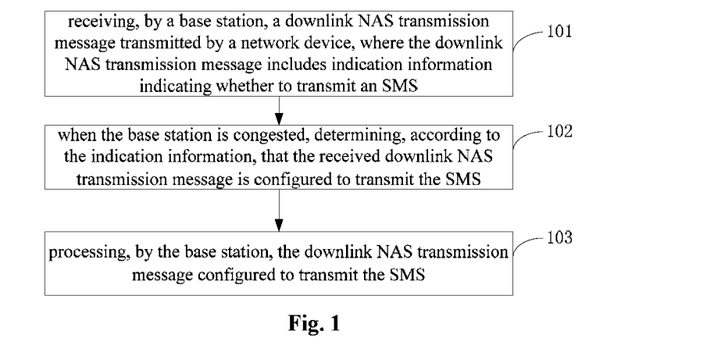
FIG. 1 is a flow chart of an embodiment of a method for processing message overload according to the invention.

FIG. 1 is a flow chart of an embodiment of a method for processing message overload according to the invention. An overload process for a downlink transmission message when a base station is congested is illustrated in the embodiment.

In step 101, the base station receives a downlink NAS transmission message transmitted by a network device, where the downlink NAS transmission message includes indication information indicating whether to transmit an SMS.

Besides being configured to transmit the downlink SMS, the downlink NAS transmission message is also mainly configured to transmit control signaling between a UE and an MME. The SMS belongs to a non-real-time service, which may be selectively discarded. The control signaling has a high real-time performance and thus has a priority higher than that of the SMS, therefore, the control signaling usually should not be discarded. To identify content transmitted by the downlink NAS transmission message, indication information for the SMS is added in the downlink NAS transmission message in the embodiment, which may be achieved by any one of the following ways.

In the first way, the downlink NAS transmission message includes an SMS indication field, and a field value of the SMS indication field indicates whether to transmit the SMS. For example, the downlink NAS transmission message is configured to transmit the SMS if the field value is "YES", and the downlink NAS transmission message is not configured to transmit the SMS if the field value is "NO". For another example, the field value is represented by a priority, the downlink NAS transmission message is configured to transmit the SMS if the field value is "low", and the downlink NAS transmission message is not configured to transmit the SMS if the field value is "high". In addition, if the network device regards the SMS as an SMS with a high priority, the value of the SMS indication field may be set as "NO" or "High" by the network device, so as to distinguish the SMS from a normal SMS.

In the second way, the downlink NAS transmission message includes downlink generic NAS transport message content (Downlink Generic NAS Transport Message Content), and a protocol discriminator field (Protocol Discriminator) in the downlink generic NAS transport message content is reused with a type set for the protocol discriminator field indicating whether to transmit the SMS. For example, if the protocol discriminator filed is set as an SMS type, the downlink NAS transmission message is configured to transmit the SMS, and if the protocol discriminator field is set as other types, the downlink NAS transmission message is not configured to transmit the SMS. In addition, if the network device regards the SMS as an SMS with a high priority, the value of the SMS indication field may be set as "NO" or "High" by the network device, so as to distinguish the SMS from a normal SMS.

In the third way, the downlink NAS transmission message includes downlink generic NAS transport message content (Downlink Generic NAS Transport Message Content), and an SMS indication field is added in the downlink generic NAS transport message content with a field value of the SMS indication field indicating whether to transmit the SMS. For example, the downlink NAS transmission message is configured to transmit the SMS if the field value is "YES", and the downlink NAS transmission message is not configured to transmit the SMS if the field value is "NO". For another example, the field value is represented by a priority, the downlink NAS transmission message is configured to transmit the SMS if the field value is "low", and the downlink NAS transmission message is not configured to transmit the SMS if the field value is "high". In addition, if the network device regards the SMS as an SMS with a high priority, the value of the SMS indication field may be set as "NO" or "High" by the network device, so as to distinguish the SMS from a normal SMS.

In the embodiment, the network device mainly refers to an MME device in the network.

In step 102, in a case that the base station is congested, it is determined, based on the indication information, that the received downlink NAS transmission message is configured to transmit the SMS.

In a case that the base station is congested, the received downlink NAS transmission messages are differently processed. The base station acquires indication information in the received downlink NAS transmission message, and determines based on the indication information that whether the received downlink NAS transmission message includes an SMS, that is, determines whether the downlink NAS transmission message is configured to transmit the SMS. In this way, the downlink NAS transmission message configured to transmit the SMS is determined from the received downlink NAS transmission messages.

In step 103, the base station processes the downlink NAS transmission message configured to transmit the SMS.

The base station may discard the received downlink NAS transmission message configured to transmit the SMS, or delay transmission of the downlink NAS transmission message configured to transmit the SMS by a preset time period.

It can be seen from the above embodiment that, in the downlink transmission process, in a case that the base station is congested, the downlink NAS transmission message configured to transmit the SMS may be identified based on the indication information included in the downlink NAS transmission message, to enable the base station to discard the downlink NAS transmission message or delay transmission of the downlink NAS transmission message, which relieves the congestion of the base station, therefore, the NAS transmission message configured to transmit the control signaling can be transmitted normally and the base station can perform normal call connection, which ensures services of the base station.

Figure 2:
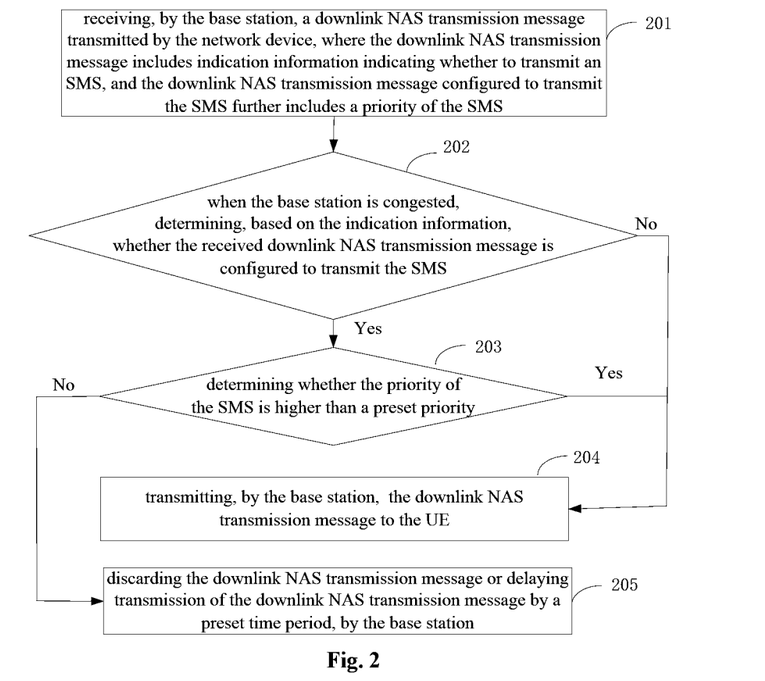
FIG. 2 is a flow chart of another embodiment of a method for processing message overload according to the invention.

FIG. 2 is a flow chart of another embodiment of a method for processing message overload according to the invention. An overload process for a downlink transmission message when a base station is congested is illustrated in the embodiment. A downlink NAS transmission message configured to transmit an SMS includes a priority of the SMS in the embodiment.

In step 201, the base station receives a downlink NAS transmission message transmitted by a network device, where the downlink NAS transmission message includes indication information indicating whether to transmit an SMS and the downlink NAS transmission message configured to transmit the SMS includes a priority of the SMS.

Besides being configured to transmit the SMS, the downlink NAS transmission message is mainly configured to transmit control signaling between a UE and an MME. The SMS belongs to a non-real-time service, which may be selectively discarded. The control signaling has a high real-time performance and thus has a priority higher than that of the SMS, therefore, the control signaling usually should not be discarded. To identify content transmitted by the downlink NAS transmission message, indication information for the SMS is added in the downlink NAS transmission message in the embodiment, which may be achieved by any one of the following ways.

In the first way, the downlink NAS transmission message includes an SMS indication field, and a field value of the SMS indication field indicates whether to transmit the SMS. For example, the downlink NAS transmission message is configured to transmit the SMS if the field value is "YES", and the downlink NAS transmission message is not configured to transmit the SMS if the field value is "NO". For another example, the field value is represented by a priority, the downlink NAS transmission message is configured to transmit the SMS if the field value is "low", and the downlink NAS transmission message is not configured to transmit the SMS if the field value is "high".

In the second way, the downlink NAS transmission message includes downlink generic NAS transport message content (Downlink Generic NAS Transport Message Content), and a protocol discriminator field (Protocol Discriminator) in the downlink generic NAS transport message content is reused with a type set for the protocol discriminator field indicating whether to transmit the SMS. For example, if the protocol discriminator filed is set as an SMS type, the downlink NAS transmission message is configured to transmit the SMS, and if the protocol discriminator field is set as other types, the downlink NAS transmission message is not configured to transmit the SMS.

In the third way, the downlink NAS transmission message includes downlink generic NAS transport message content (Downlink Generic NAS Transport Message Content), and an SMS indication field is added in the downlink generic NAS transport message content with a field value of the SMS indication field indicating whether to transmit the SMS. For example, the downlink NAS transmission message is configured to transmit the SMS if the field value is "YES", and the downlink NAS transmission message is not configured to transmit the SMS if the field value is "NO". For another example, the field value is represented by a priority, the downlink NAS transmission message is configured to transmit the SMS if the field value is "low", and the downlink NAS transmission message is not configured to transmit the SMS if the field value is "high".

In the embodiment, to selectively process the downlink NAS transmission messages configured to transmit the SMS when the base station is congested, the priority of the SMS may be included in the downlink NAS transmission message configured to transmit the SMS, so as to ensure that the SMS with a high priority can be normally transmitted when the base station is congested. For example, multiple priorities may be set, with the priority of 1 indicates a highest priority, the priority of 2 indicates a second highest priority, and so on.

In the embodiment, the network device mainly refers to an MME device in the network. The priority of the SMS, which is included in the downlink NAS transmission message transmitted to the base station by the MME device, may be transmitted from a GMSC (Gateway Mobile Switching Center) to an MSC (Mobile Services switching Center) and then transmitted from the MSC to the MME device. Alternatively, the priority of the SMS, which is included in the downlink NAS transmission message transmitted to the base station by the MME device, may be directly transmitted from the GMSC or an MTC (Mobile Terminated Call)-IWF (Interworking Function) device to the MME device.

In the embodiment, the indication information of the SMS and the priority of the SMS may be indicated by different fields or indicated by a same field. In a case that the indication information of the SMS and the priority of the SMS are indicated by one field, the downlink NAS transmission message may only include the priority, that is, the priority implies that the downlink NAS transmission message is configured to transmit the SMS.

In step 202, in a case that the base station is congested, it is determined, based on the indication information, whether the received downlink NAS transmission message is the downlink NAS transmission message configured to transmit the SMS, step 203 is performed if the received downlink NAS transmission message is configured to transmit the SMS, and step 204 is performed if the received downlink NAS transmission message is not configured to transmit the SMS.

In a case that the base station is congested, the received downlink NAS transmission messages are differently processed. The base station acquires indication information in the received downlink NAS transmission message, and determines based on the indication information that whether the received downlink NAS transmission message includes an SMS, that is, determines whether the downlink NAS transmission message is configured to transmit the SMS. In this way, the downlink NAS transmission message configured to transmit the SMS is determined from the received downlink NAS transmission messages.

In step 203, it is determined whether the priority of the SMS is higher than a preset priority, step 204 is performed if the priority of the SMS is higher than the preset priority, and step 205 is performed if the priority of the SMS is not higher than the preset priority.

In the embodiment, the preset priority may be issued to the base station by the network device in advance, and is saved by the base station.

In the embodiment, for example, there are five priorities with values being "1, 2, 3, 4, 5" from high to low as illustrated in step 201, and the preset priority may be set as "3", then in a case that the downlink NAS transmission message configured to transmit the SMS is determined, the priority of the SMS may be read from the message, step 204 may be performed if the value of the priority is higher than 3, that is, 1 or 2, and step 205 may be performed if the value of the priority is not higher than 3.

In step 204, the base station transmits the downlink NAS transmission message to the UE, and the current process is finished.

In a case that it is determined in step 202 that the received downlink NAS transmission message is not configured to transmit the SMS, it is indicated that the downlink NAS transmission message is configured to transmit control signaling, so the downlink NAS transmission message is directly transmitted.

In a case that it is determined in step 203 that the priority of the SMS is higher than the preset priority, it is indicated that the SMS is important, so the downlink NAS transmission message including the SMS is directly transmitted.

In step 205, the base station discards the downlink NAS transmission message or delaying transmission of the downlink NAS transmission message by a preset time period, and the current process is finished.

In a case that it is determined in step 203 that the priority of the SMS is not higher than the preset priority, it is indicated that the SMS is not important, then the downlink NAS transmission message including the SMS may be directly discarded by the base station or the downlink NAS transmission message including the SMS is transmitted after a preset time period (during which the base station may become normal from the congestion state). Transmissions of the downlink NAS transmission message including the SMS are reduced to relieve congestion of the base station.

It can be seen from the above embodiment that, in the downlink transmission process, in a case that the base station is congested, the downlink NAS transmission message configured to transmit the SMS can be identified based on the indication information included in the downlink NAS transmission message, to enable the base station to discard the downlink NAS transmission message or delay the transmission of the downlink NAS transmission message, which relieves the congestion of the base station, therefore, the NAS transmission message configured to transmit control signaling can be transmitted normally and the base station can perform normal call connection, which ensures services of the base station. In the embodiment, a priority for the SMS may be further set to ensure normal transmission of some important SMSs by the downlink NAS transmission message in a case that the base station is congested.

Figure 3:
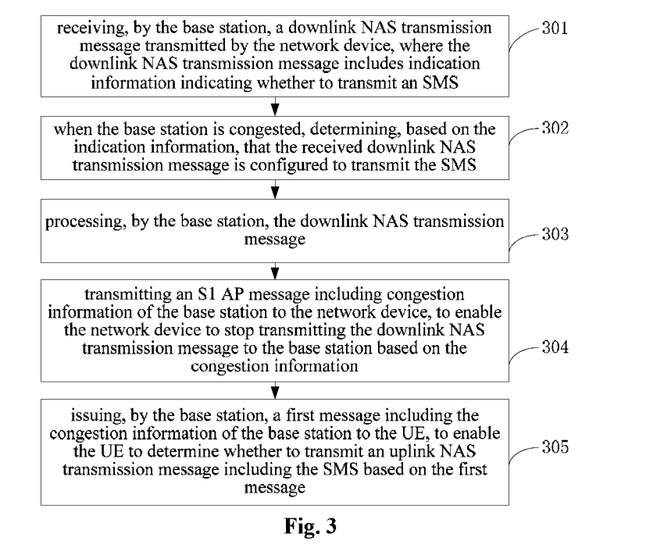
FIG. 3 is a flow chart of another embodiment of a method for processing message overload according to the invention.

FIG. 3 is a flow chart of another embodiment of a method for processing message overload according to the invention. An overload process for a downlink transmission message when a base station is congested is illustrated in the embodiment. The base station may transmit a message about congestion of the base station to a network device and a UE in the embodiment.

In step 301, the base station receives a downlink NAS transmission message transmitted by the network device, where the downlink NAS transmission message includes indication information indicating whether to transmit an SMS.

Besides being configured to transmit the downlink SMS, the downlink NAS transmission message is also mainly configured to transmit control signaling between a UE and an MME. The SMS belongs to a non-real-time service, which may be selectively discarded. The control signaling has a high real-time performance and thus has a priority higher than that of the SMS, therefore, the control signaling usually should not be discarded. To identify content transmitted by the downlink NAS transmission message, indication information for the SMS is added in the downlink NAS transmission message in the embodiment, which may be achieved by any one of the following ways.

In the first way, the downlink NAS transmission message includes an SMS indication field, and a field value of the SMS indication field indicates whether to transmit the SMS. For example, the downlink NAS transmission message is configured to transmit the SMS if the field value is "YES", and the downlink NAS transmission message is not configured to transmit the SMS if the field value is "NO". For another example, the field value is represented by a priority, the downlink NAS transmission message is configured to transmit the SMS if the field value is "low", and the downlink NAS transmission message is not configured to transmit the SMS if the field value is "high".

In the second way, the downlink NAS transmission message includes downlink generic NAS transport message content (Downlink Generic NAS Transport Message Content), and a protocol discriminator field (Protocol Discriminator) in the downlink generic NAS transport message content is reused with a type set for the protocol discriminator field indicating whether to transmit the SMS. For example, if the protocol discriminator filed is set as an SMS type, the downlink NAS transmission message is configured to transmit the SMS, and if the protocol discriminator field is set as other types, the downlink NAS transmission message is not configured to transmit the SMS.

In the third way, the downlink NAS transmission message includes downlink generic NAS transport message content (Downlink Generic NAS Transport Message Content), and an SMS indication field is added in the downlink generic NAS transport message content with a field value of the SMS indication field indicating whether to transmit the SMS. For example, the downlink NAS transmission message is configured to transmit the SMS if the field value is "YES", and the downlink NAS transmission message is not configured to transmit the SMS if the field value is "NO". For another example, the field value is represented by a priority, the downlink NAS transmission message is configured to transmit the SMS if the field value is "low", and the downlink NAS transmission message is not configured to transmit the SMS if the field value is "high".

In the embodiment, the network device mainly refers to an MME device in the network.

In step 302, in a case that the base station is congested, it is determined, based on the indication information, that the received downlink NAS transmission message is configured to transmit the SMS.

In a case that the base station is congested, the received downlink NAS transmission messages are differently processed. The base station acquires indication information in the received downlink NAS transmission message, and determines based on the indication information that whether the received downlink NAS transmission message includes an SMS, that is, determines whether the downlink NAS transmission message is configured to transmit the SMS. In this way, the downlink NAS transmission message configured to transmit the SMS is determined from the received downlink NAS transmission messages.

In step 303, the base station processes the downlink NAS transmission message.

The base station may discard the received downlink NAS transmission message configured to transmit the SMS, or delay transmission of the downlink NAS transmission message configured to transmit the SMS by a preset time period.

In step 304, an S1 AP message including congestion information of the base station is transmitted to the network device, to enable the network device to stop transmitting the downlink NAS transmission message to the base station based on the congestion information.

In the embodiment, in a case that the base station is congested, in order to reduce the downlink NAS transmission messages in the downlink transmission direction, the base station may transmit the S1 AP (S1 Application Protocol, Application Layer Protocol) message including the congestion information of the base station to the network device. After receiving the AP message, the network device obtains congestion condition of the base station based on the congestion information in the AP message. Therefore, the network device stops transmitting the downlink NAS transmission message to the base station to relieve the congestion of the base station. The downlink NAS transmission message stopped to be transmitted mainly refers to the downlink NAS transmission message including the SMS.

In step 305, the base station issues a first message including the congestion information of the base station to the UE, to enable the UE to determine, based on the first message, whether to transmit an uplink NAS transmission message including the SMS.

In the embodiment, in a case that the base station is congested, in order to reduce the uplink NAS transmission message including the SMS in the uplink transmission direction, the base station may transmit the first message including the congestion information of the base station to the UE. The first message may be a system message including a first parameter transmitted by the base station in a broadcast way. Once the first parameter is detected by the UE, the UE is triggered to determine, based on a second parameter in the system message, that the uplink NAS transmission message including the SMS is not allowed to be transmitted, then the UE stops transmitting the uplink NAS transmission message to the base station, so as to relieve the congestion of the base station. Alternatively, the first message may be a RRC (Radio Resource Control Protocol) message including the congestion information of the base station which is transmitted by the base station when the base station is congested. Once the RRC message is received by the UE, the UE detects the congestion information of the base station from the RRC message, and in a case that the congestion information of the base station is detected, the UE stops transmitting the uplink NAS transmission message including the SMS to the base station, or delays transmission of the uplink NAS transmission message including the SMS by a preset time period, so as to relieve the congestion of the base station.

It should be noted that in the above embodiment, step 304 and step 305 may be performed by the base station simultaneously without considering execution sequence, or only one of step 304 and step 305 is performed by the base station. In addition, in the above embodiment, a priority may be set for the SMS as in the second embodiment, to further identify an important SMS, which is not described in detail herein.

It can be seen from the above embodiment that, in the downlink transmission process, in a case that the base station is congested, the downlink NAS transmission message configured to transmit the SMS may be identified based on the indication information included in the downlink NAS transmission message, to enable the base station to discard the downlink NAS transmission message or delay transmission of the downlink NAS transmission message, which relieves the congestion of the base station, therefore, the NAS transmission message configured to transmit the control signaling can be transmitted normally and the base station can perform normal call connection, which ensures services of the base station. In the embodiment, the base station may further inform the network device or the UE of the congestion, to enable the network device or the UE to control transmission of the NAS transmission message including the SMS, so as to relieve the congestion of the base station.

Figure 4:
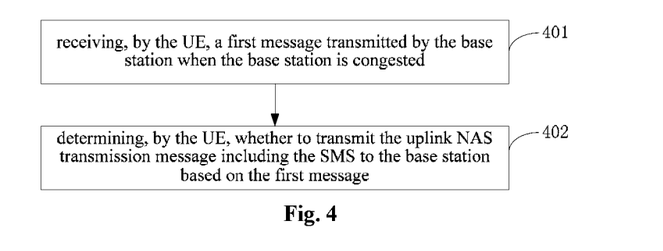
FIG. 4 is a flow chart of another embodiment of a method for processing message overload according to the invention.

FIG. 4 is a flow chart of another embodiment of a method for processing message overload according to the invention. An overload process for an uplink transmission message by a UE when a base station is congested is illustrated in the embodiment.

In step 401, the UE receives a first message transmitted by the base station when the base station is congested.

In a case that the base station is congested, in order to reduce uplink NAS transmission messages in the uplink transmission direction, the base station may transmit the first message including congestion information of the base station to the UE.

In step 402, the UE determines whether to transmit the uplink NAS transmission message including the SMS to the base station based on the first message.

In a case that the first message in step 401 is a system message including the first parameter which is transmitted by the base station in a broadcast way, the UE is triggered to determine that the uplink NAS transmission message including the SMS is not allowed to be transmitted based on a second parameter included in the system message after the first parameter is detected by the UE in the system message, then the UE stops transmitting the uplink NAS transmission message including the SMS to the base station, so as to relieve congestion of the base station.

In a case that the first message in step 401 is a RRC message including congestion information of the base station which is transmitted by the base station when the base station is congested, the UE detects the congestion information of the base station in the RRC message after receiving the RRC message, and in a case that the congestion information of the base station is detected, the UE stops transmitting the uplink NAS transmission message including the SMS to the base station or delays transmission of the uplink NAS transmission message including the SMS by a preset time period, so as to relieve the congestion of the base station.

It can be seen from the above embodiment that in the uplink transmission, in a case that the base station is congested, the base station may transmit its own congestion information to the UE, to enable the UE to selectively discard or delay transmission of the uplink NAS transmission message including the SMS, to relieve the congestion of the base station, so that the base station can receive control signaling, and services of the base station are ensured.

Figure 5:
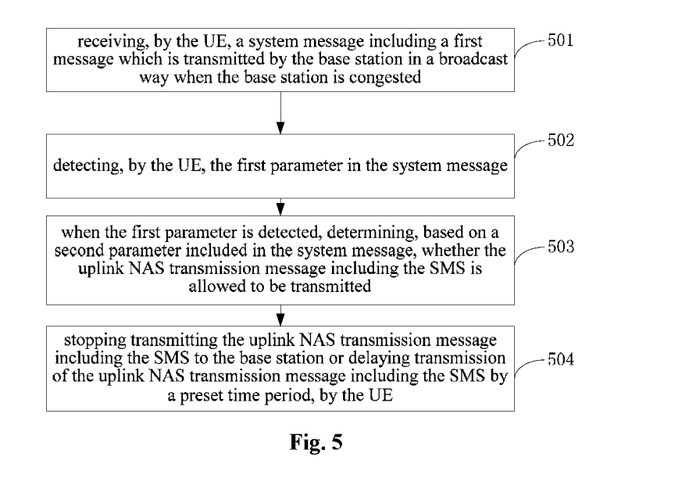
FIG. 5 is a flow chart of another embodiment of a method for processing message overload according to the invention.

FIG. 5 is a flow chart of another embodiment of a method for processing message overload according to the invention. An overload process for an uplink transmission message by a UE based on a system message broadcasted by a based station when the base station is congested is illustrated in the embodiment.

In step 501, the UE receives the system message including a first message which is transmitted by the base station in a broadcast way when the base station is congested.

In a case that the base station is congested, in order to reduce uplink NAS transmission messages in the uplink transmission direction, the base station may broadcast the system message including the first message.

The first parameter in the system message (SystemInformationBlockType2 information element) may be a newly added ssac-BarringForSMS-overNAS (service access control-barring for SMS over non-access stratum) parameter, or an ac-BarringForCSFBSMSOnly-r10 (access control-barring for CSFB SMS) parameter, or an ac-BarringForSMS-overNAS (access control-barring for SMS over non-access stratum) parameter. The first parameter is to trigger the UE to determine whether the uplink NAS transmission message including the SMS is allowed to be transmitted.

In step 502, the UE detects the first parameter in the system message.

In step 503, once the first parameter is detected, it is determined, based on a second parameter included in the system message, whether the uplink NAS transmission message including the SMS is allowed to be transmitted.

The second parameter in the system message (SystemInformationBlockType2 information element) may be an ac-BarringFactor (access control-barring factor) parameter or an ac-BarringTime (access control-barring time) parameter or an ac-BarringForSpecialAC (access control-barring for special access control) parameter, which is originally included in the system message.

In a case that the UE detects that the first parameter included in the system message SystemInformationBlockType2 is an existing ac-BarringForCSFBSMSOnly-r10 (access control-barring for CSFB SMS) parameter or an existing ac-BarringForSMS-overNAS (access control-barring for SMS over non-access stratum) parameter, the UE takes the first parameter as an ac Barring Parameter (access control barring parameter), and the ac Barring Parameter (access control barring parameter) triggers the UE to determine whether to transmit the uplink NAS transmission message including the SMS. The determining is as follows. In a case that there are one or more Access Classes on a USIM (Universal Subscriber Identity Module) card of the UE, with values of the access classes being between 11 and 15, the UE is allowed to transmit the uplink NAS transmission message including the SMS if valid access classes stored in the UE are set as 0 in the ac-BarringForSpecialAC (access control-barring for special access control) parameter used as a second parameter in the ac Barring Parameter (access control barring parameter); otherwise, a random number between 0 to 1 is generated, the UE is allowed to transmit the uplink NAS transmission message including the SMS if the random number is smaller than the ac-BarringFactor (control access-barring factor) parameter used as the second parameter in the ac Barring Parameter (access control barring parameter), and the UE is not allowed to transmit the uplink NAS transmission message including the SMS if the random number is not smaller than the ac-BarringFactor (control access-barring factor) parameter used as the second parameter in the ac Barring Parameter (access control barring parameter). In a case that the UE is not allowed to transmit the uplink NAS transmission message including the SMS, the UE may start a Tbarring (Time barring, Time barring) timer configured to re-determine whether the uplink NAS transmission message including the SMS is allowed to be transmitted at the end of a timing cycle, and the timing cycle of the timer Tbarring may be set as Tbarring=(0.7+ 0.6*rand)*ac-BarringTime, where rand is a random number between 0 and 1.

In a case that the UE detects that the first parameter included in the system message SystemInformationBlockType2 is an ssac-BarringForSMS-overNAS (service access control-barring for SMS over non-access stratum) parameter, the UE takes the first parameter as an ac Barring Parameter (access control barring parameter), and the ac Barring Parameter (access control barring parameter) triggers the UE to determine whether to transmit the uplink NAS transmission message including the SMS. The determining is as follows. The UE needs to set a BarringForSMS-overNAS (barring for SMS time over non-access stratum) parameter after receiving a request from an upper service layer. In this case, when the UE is idle, the UE receives an ssac-BarringForSMS-overNAS (service access control-barring for SMS over non-access stratum) parameter. In a case that there are one or more Access Classes (access classes) on a USIM card of the UE with values of the access classes being between 11 and 15, the BarringFactorForSMSoverNAS (barring factor for SMS over non-access stratum) parameter is set as 1 and the BarringTimeForSMSoverNAS (barring time for SMS over non-access stratum) parameter is set as 0 if valid Access Classes stored in the UE are set as 0 in a parameter corresponding to the ac-BarringForSpecialAC (access control-barring for special access control) parameter used as a second parameter in the ssac-BarringForSMS-overNAS (service access control-barring for SMS over non-access stratum) parameter; otherwise, the BarringFactorForSMSoverNAS (barring factor for SMS over non-access stratum) parameter and the BarringTimeForSMSoverNAS (barring time for SMS over non-access stratum) parameter are respectively set as the ac-BarringFactor (access control-barring factor) parameter and the ac-BarringTime (access control-barring time) parameter which are included in the ssac-BarringForSMS-overNAS (service access control-barring for SMS over non-access stratum) parameter. The UE then transmits the set BarringFactorForSMSoverNAS to an upper-layer application, and whether the UE is allowed to transmit the uplink NAS transmission message including the SMS is determined by the upper-layer application based on the set parameter.

In step 504, in a case that it is determined that the uplink NAS transmission message including the SMS is not allowed to be transmitted, the UE stops transmitting the uplink NAS transmission message including the SMS to the base station, or delays transmission of the uplink NAS transmission message including the SMS by a preset time period.

It can be seen from the above embodiment that in the uplink transmission, the base station may transmit its congestion information to the UE when the base station is congested, to enable the UE to selectively discard or delay transmission of the uplink NAS transmission message including the SMS, which relieves congestion of the base station, therefore, the base station can receive control signaling, which ensures services of the base station.

Figure 6:
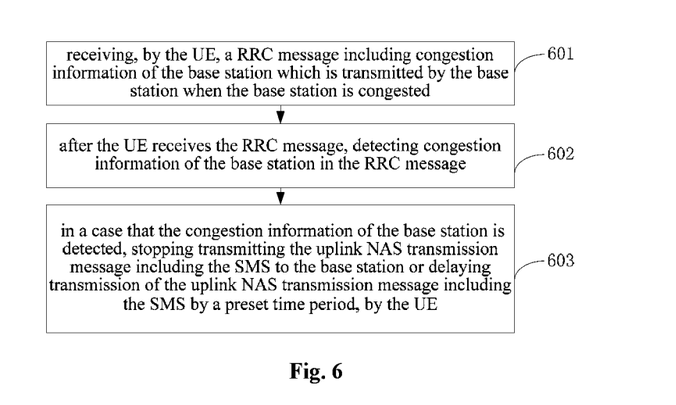
FIG. 6 is a flow chart of another embodiment of a method for processing message overload according to the invention.

FIG. 6 is a flow chart of another embodiment of a method for processing message overload according to the invention. An overload process for an uplink transmission message by a UE based on a RRC message transmitted by a system when a base station is congested is illustrated in the embodiment.

In step 601, the UE receives the RRC message including the congestion information of the base station which is transmitted by the base station when the base station is congested In a case that the base station is congested, in order to reduce the uplink NAS transmission message in the uplink transmission direction, the base station may transmit the RRC message including the congestion information to the UE.

In step 602, the UE detects congestion information of the base station in the RRC message after receiving the RRC message.

In step 603, in a case that the congestion information of the base station is detected, the UE stops transmitting the uplink NAS transmission message including the SMS to the base station or delays transmission of the uplink NAS transmission message including the SMS by a preset time period.

It can be seen from the above embodiment that in the uplink transmission, the base station may transmit its congestion information to the UE when the base station is congested, to enable the UE to selectively discard or delay transmission of the uplink NAS transmission message including the SMS, which relieves congestion of the base station, therefore, the base station can receive control signaling, which ensures services of the base station.

Corresponding to the embodiments of the method for processing message overload according to the invention, embodiments of a device for processing message overload are further provided by the invention.

Figure 7:
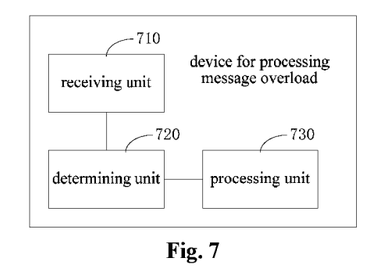
FIG. 7 is a block diagram of an embodiment of a device for processing message overload according to the invention.

FIG. 7 is a block diagram of an embodiment of a device for processing message overload according to the invention. The device is normally located at a base station and configured to process overloaded messages when the base station is congested.

The device includes a receiving unit 710, a determining unit 720 and a processing unit 730.

The receiving unit 710 is configured to receive a downlink NAS transmission message transmitted by a network device, where the downlink NAS transmission message includes indication information indicating whether to transmit an SMS.

The downlink NAS transmission message received by the receiving unit 710 may include any of indication information indicating whether to transmit the SMS as follows. The downlink NAS transmission message includes an SMS indication field, and a field value of the SMS indication field is configured to indicate whether to transmit the SMS. The downlink NAS transmission message includes downlink generic NAS transport message content, a protocol discriminator field in the downlink generic NAS transport message content is reused, and a type set for the protocol discriminator field is configured to indicate whether to transmit the SMS. The downlink NAS transmission message includes downlink generic NAS transport message content, an SMS indication field is added in the downlink generic NAS transport message content, and a field value of the SMS indication field is configured to indicate whether to transmit the SMS.

The determining unit 720 is configured to determine, based on the indication information received by the receiving unit 701, that the received downlink NAS transmission message is configured to transmit the SMS, in a case that the base station is congested.

The processing unit 730 is configured to process the downlink NAS transmission message configured to transmit the SMS which is received by the receiving unit 710, after the determining unit 720 determines that the received downlink NAS transmission message is configured to transmit the SMS.

In an implementation, the processing unit may include at least one of the following subunits (not shown in FIG. 7):

a discarding subunit, configured to discard the downlink NAS transmission message configured to transmit the SMS which is received by the receiving unit 710; and a delay subunit, configured to delay transmission of the downlink NAS transmission message configured to transmit the SMS which is received by the receiving unit 710 by a preset time period.

In another implementation, the device may further include (not shown in FIG. 7) a saving unit configured to save a preset priority of the SMS which is issued by the network device.

Correspondingly, in a case that the downlink NAS transmission message received by the receiving unit 710 further includes a priority of the SMS, the processing unit may include (not shown in FIG. 7):

a determining subunit, configured to determine whether the priority of the SMS received by the receiving unit 710 is higher than the preset priority saved by the saving unit;

a transmission subunit, configured to transmit the downlink NAS transmission message configured to transmit the SMS which is received by the receiving unit 710 in a case that the determining subunit determines that the priority of the SMS received by the receiving unit 710 is higher than the preset priority saved by the saving unit; and a processing subunit, configured to discard the downlink NAS transmission message configured to transmit the SMS which is received by the receiving unit 710 or delay transmission of the downlink NAS transmission message configured to transmit the SMS which is received by the receiving unit 710 by a preset time period, in a case that the determining subunit determines that the priority of the SMS received by the receiving unit 710 is not higher than the preset priority saved by the saving unit.

Figure 8:
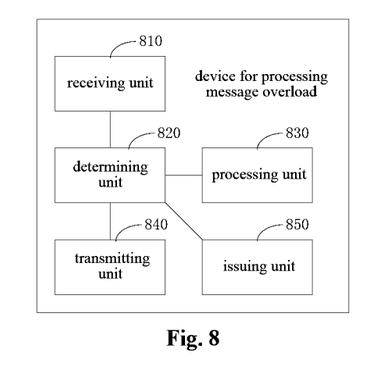
FIG. 8 is a block diagram of another embodiment of a device for processing message overload according to the invention.

FIG. 8 is a block diagram of another embodiment of a device for processing message overload according to the invention. The device is normally located at a base station and configured to process overloaded messages when the base station is congested.

The device includes a receiving unit 810, a determining unit 820, a processing unit 830, a transmitting unit 840 and an issuing unit 850.

The receiving unit 810 is configured to receive a downlink NAS transmission message transmitted by a network device, where the downlink NAS transmission message includes indication information indicating whether to transmit an SMS.

The downlink NAS transmission message received by the receiving unit 810 may include any of indication information indicating whether to transmit the SMS as follows. The downlink NAS transmission message includes an SMS indication field, and a field value of the SMS indication field is configured to indicate whether to transmit the SMS. The downlink NAS transmission message includes downlink generic NAS transport message content, a protocol discriminator field in the downlink generic NAS transport message content is reused, and a type set for the protocol discriminator field is configured to indicate whether to transmit the SMS. The downlink NAS transmission message includes downlink generic NAS transport message content, an SMS indication field is added in the downlink generic NAS transport message content, and a field value of the SMS indication field is configured to indicate whether to transmit the SMS.

The determining unit 820 is configured to determine, based on the indication information received by the receiving unit 810, that the received downlink NAS transmission message is configured to transmit the SMS, in a case that the base station is congested.

The processing unit 830 is configured to process the downlink NAS transmission message configured to transmit the SMS which is received by the receiving unit 810, after the determining unit 820 determines that the received downlink NAS transmission message is configured to transmit the SMS.

In an implementation, the processing unit may include at least one of the following subunits (not shown in FIG. 8):

a discarding subunit, configured to discard the downlink NAS transmission message configured to transmit the SMS which is received by the receiving unit 810; and a delay subunit, configured to delay transmission of the downlink NAS transmission message configured to transmit the SMS which is received by the receiving unit 810 by a preset time period.

In another implementation, the device may further include (not shown in FIG. 8) a saving unit configured to save a preset priority of the SMS which is issued by the network device.

Correspondingly, in a case that the downlink NAS transmission message received by the receiving unit 810 further includes a priority of the SMS, the processing unit may include (not shown in FIG. 8):

a determining subunit, configured to determine whether the priority of the SMS which is received by the receiving unit 810 is higher than the preset priority saved by the saving unit;

a transmission subunit, configured to transmit the downlink NAS transmission message configured to transmit the SMS which is received by the receiving unit 810 in a case that the determining subunit determines that the priority of the SMS which is received by the receiving unit 810 is higher than the preset priority saved by the saving unit; and a processing subunit, configured to discard the downlink NAS transmission message configured to transmit the SMS which is received by the receiving unit 810 or delay transmission of the downlink NAS transmission message configured to transmit the SMS which is received by the receiving unit 810 by a preset time period, in a case that the determining subunit determines that the priority of the SMS received by the receiving unit 810 is not higher than the preset priority saved by the saving unit.

The transmitting unit 840 is configured to transmit an AP message including congestion information of the base station to the network device after the determining unit 820 determines that the received downlink NAS transmission message is configured to transmit the SMS, to enable the network device to stop transmitting the downlink NAS transmission message to the base station based on the congestion information.

The issuing unit 850 is configured to issue a first message including the congestion information of the base station to the UE after the determining unit 820 determines that the received downlink NAS transmission message is configured to transmit the SMS, to enable the US to determine whether to transmit an uplink NAS transmission message including the SMS to the base station based on the first message.

It should be noted that for convenience of illustration, the transmitting unit 840 and the issuing unit 850 are both illustrated in FIG. 8. However, in actual application, it may be as required that only one of the transmitting unit 840 and the issuing unit 850 is adopted.

Figure 9:
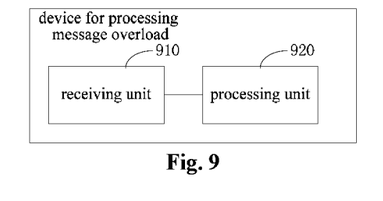
FIG. 9 is a block diagram of another embodiment of a device for processing message overload according to the invention.

FIG. 9 is a block diagram of another embodiment of a device for processing message overload according to the invention. The device is normally located at a UE and configured to process an uplink transmission message based on a message issued by a base station in a case that the base station is congested.

The device includes a receiving unit 910 and a processing unit 920.

The receiving unit 910 is configured to receive a first message transmitted by the base station when the base station is congested.

The processing unit 920 is configured to determine whether to transmit an uplink NAS transmission message including an SMS to the base station based on the first message received by the receiving unit 910.

In an implementation, the receiving unit 910 may be configured to receive a system message including the first message which is transmitted by the base station in a broadcast way when the base station is congested.

Correspondingly, the processing unit 920 may include (not shown in FIG. 9): a first detecting subunit, configured to detect the first parameter in the system message received by the receiving unit 910; a determining subunit, configured to determine, based on a second parameter included in the system message, whether the uplink NAS transmission message including the SMS is allowed to be transmitted in a case that the first parameter is detected by the first detecting subunit; a first processing subunit, configured to stop transmitting the uplink NAS transmission message including the SMS to the base station in a case that the determining subunit determines that the uplink NAS transmission message including the SMS is not allowed to be transmitted.

In another implementation, the receiving unit 910 may be configured to receive a RRC message including congestion information of the base station which is transmitted by the base station when the base station is congested.

Correspondingly, the processing unit 920 may include (not shown FIG. 9): a second detecting subunit, configured to detect the congestion information of the base station in the RRC message after the receiving unit 910 receives the RRC message; a second processing subunit, configured to stop transmitting the uplink NAS transmission message including the SMS to the base station or delay transmission of the uplink NAS transmission message including the SMS by a preset time period in a case that the congestion information of the base station is detected by the second detecting subunit.

It can be seen from the above embodiment that in the downlink transmission, the base station receives a downlink NAS message including indication information of an SMS which is transmitted by a network device. When the base station is congested, the downlink NAS transmission message is processed in a preset manner if it is determined based on the indication information that the received downlink NAS transmission message is configured to transmit the SMS. In the uplink transmission, a UE receives a first message transmitted by the base station when the base station is congested, and determines whether to transmit an uplink NAS transmission message to the base station based on the first message. According to the embodiments of the invention, in the downlink transmission process, in a case that the base station is congested, the downlink NAS transmission message configured to transmit the SMS can be identified according to the indication information in the downlink NAS transmission message, to enable the base station to discard the downlink NAS transmission message or delay transmission of the downlink NAS transmission message, which relieves the congestion of the base station, therefore, the NAS transmission message configured to transmit control signaling can be transmitted normally and the base station can perform normal call connection, which ensures services of the base station. In the uplink transmission process, in a case that the base station is congested, the base station may inform the UE of its congestion information, to enable the UE to selectively discard or delay transmission of the uplink NAS transmission message including the SMS, which relieves the congestion of the base station, therefore, the base station can perform normal call connection and services of the base station are ensured.

It should be noted that, in the embodiments of the device for processing message overload, the units included in the device are distinguished by functional logic but not limited herein as long as the functions can be realized. In addition, names of the function units are only to distinguish from each other and are not intent to limit protection scope of the invention.

In addition, it can be understood for persons of ordinary skill in the art that few or all steps of implementing the embodiments of the method may be completed through instructing associated hardware by a program, the corresponding program may be stored in a computer readable storage medium, which may be a read-only memory, a disk or a compact disk.

Preferred embodiments of the invention are described above, to which the protection scope of the invention is not limited. Modifications or replacements which can be easily made by the persons of ordinary skill in the art within the technical scope disclosed by the embodiments of the invention are within the protection scope of the claims. Therefore, the protection scope of the invention should refer to the protection scope of the claims.

What is claimed is:
1. A method for processing message overload, comprising:
receiving, by a base station, a downlink Non-Access Stratum (NAS) transmission message transmitted by a network device, wherein the downlink NAS transmission message comprises indication information indicating whether the downlink NAS transmission message is configured to transmit a Short Message Service (SMS);
determining, based on the indication information, that the received downlink NAS transmission message is configured to transmit the SMS, in a case that the base station is congested; and
processing, by the base station, the downlink NAS transmission message configured to transmit the SMS, wherein the downlink NAS transmission message comprising the indication information indicating whether the downlink NAS transmission message is configured to transmit the SMS comprises one of the following:
the downlink NAS transmission message comprising an SMS indication field, wherein a field value of the SMS indication field is configured to indicate whether the downlink NAS transmission message is configured to transmit the SMS;
the downlink NAS transmission message comprising downlink generic NAS transport message content, wherein a protocol discriminator field in the downlink generic NAS transport message content is reused, with a type set for the protocol discriminator field indicating whether the downlink NAS transmission message is configured to transmit the SMS; and
the downlink NAS transmission message comprising downlink generic NAS transport message content, wherein an SMS indication field is included in the downlink generic NAS transport message content, with a field value of the SMS indication field indicating whether the downlink NAS transmission message is configured to transmit the SMS.

2. The method according to claim 1, wherein processing the downlink NAS transmission message configured to transmit the SMS comprises:
discarding the downlink NAS transmission message configured to transmit the SMS; or
delaying transmission of the downlink NAS transmission message configured to transmit the SMS by a preset time period.

3. The method according to claim 1, further comprising:
saving a preset priority of the SMS which is issued by the network device,
wherein the downlink NAS transmission message configured to transmit the SMS further comprising a priority of the SMS, and processing the received downlink NAS transmission message comprises:
transmitting the downlink NAS transmission message configured to transmit the SMS in a case that the priority of the SMS is higher than the preset priority, and discarding the downlink NAS transmission message configured to transmit the SMS or delaying transmission of the downlink NAS transmission message configured to transmit the SMS by a preset time period in a case that the priority of the SMS is lower than the preset priority.

4. The method according to claim 1, further comprising:
transmitting an Application Protocol (AP) message comprising congestion information of the base station to the network device, to request the network device to stop transmitting the downlink NAS transmission message to the base station based on the congestion information.

5. The method according to claim 1, further comprising:
issuing, by the base station, a first message comprising congestion information of the base station to user equipment (UE), to indicate the UE to determine, based on the first message, whether to transmit an uplink NAS transmission message comprising the SMS to the base station.

6. A method for processing message overload, comprising:
receiving, by a user equipment (UE), a first message transmitted by a base station when the base station is congested, wherein the receiving, by the UE, the first message transmitted by the base station when the base station is congested comprises:
receiving, by the UE, a system message comprising a first parameter which is transmitted by the base station in a broadcast manner when the base station is congested, or
the receiving, by the UE, the first message transmitted by the base station when the base station is congested comprises: receiving, by the UE, a Radio Resource Control (RRC) message comprising the congestion information of the base station which is transmitted by the base station when the base station is congested; and
determining, based on the first message, whether to transmit an uplink Non-access Stratum (NAS) transmission message comprising a Short Message Service (SMS) to the base station, wherein the determining, based on the first message, whether to transmit the uplink NAS transmission message comprising the SMS to the base station comprises:
detecting, by the UE, the first parameter in the system message,
determining, based on a second parameter comprised in the system message, whether the uplink NAS transmission message comprising the SMS is allowed to be transmitted, in a case that the first parameter is detected, and
stopping, by the UE, transmitting the uplink NAS transmission message comprising the SMS to the base station, in a case that it is determined that the uplink NAS transmission message comprising the SMS is not allow to be transmitted,
or
the determining, based on the first message, whether to transmit the uplink NAS transmission message comprising the SMS to the base station comprises:
detecting the congestion information of the base station in the RRC message after the UE receives the RRC message, and
stopping transmitting the uplink NAS transmission message comprising the SMS to the base station or delaying transmission of the uplink NAS transmission message comprising the SMS by a preset time period, in a case that the congestion information of the base station is detected.

7. A device for processing message overload, comprising a processor and a non-transitory processor-readable medium having processor-executable instructions stored thereon, the processor-executable instructions including a plurality of units, the units including:
a receiving unit, configured to receive a downlink Non-Access Stratum (NAS) transmission message transmitted by a network device, wherein the downlink NAS transmission message comprises indication information indicating whether the downlink NAS transmission message is configured to transmit a Short Message Service (SMS);
a determining unit, configured to determine, based on the indication information received by the receiving unit, that the received downlink NAS transmission message is configured to transmit the SMS, in a case that a base station is congested; and
a processing unit, configured to process the downlink NAS transmission message configured to transmit the SMS which is received by the receiving unit, after the determining unit determines that the received downlink NAS transmission message is configured to transmit the SMS, wherein the downlink NAS transmission message received by the receiving unit comprises any one of the following indication information indicating whether the downlink NAS transmission message is configured to transmit the SMS;
the downlink NAS transmission message comprising an SMS indication field, wherein a field value of the SMS indication field is configured to indicate whether to transmit the SMS;
the downlink NAS transmission message comprising downlink generic NAS transport message content, wherein a protocol discriminator field in the downlink generic NAS transport message content is reused, with a type set for the protocol discriminator field indicating whether to transmit the SMS; and
the downlink NAS transmission message comprising downlink generic NAS transport message content, wherein an SMS indication field is included in the downlink generic NAS transport message content, with a field value of the SMS indication field indicating whether to transmit the SMS.

8. The device according to claim 7, wherein the processing unit comprises at least one of following subunits:
a discarding subunit, configured to discard the downlink NAS transmission message configured to transmit the SMS which is received by the receiving unit; and
a delay subunit, configured to delay transmission of the downlink NAS transmission message configured to transmit the SMS which is received by the receiving unit by a preset time period.

9. The device according to claim 7, further comprising:
a saving unit, configured to save a preset priority of the SMS which is issued by the network device,
wherein the downlink NAS transmission message received by the receiving unit further comprises a priority of the SMS, and the processing unit comprises:
a determining subunit, configured to determine whether the priority of the SMS received by the receiving unit is higher than the preset priority saved by the saving unit;
a transmission subunit, configured to transmit the downlink NAS transmission message configured to transmit the SMS which is received by the receiving unit in a case that the determining subunit determines that the priority of the SMS received by the receiving unit is higher than the preset priority saved by the saving unit; and
a processing subunit, configured to discard the downlink NAS transmission message configured to transmit the SMS which is received by the receiving unit or delay transmission of the downlink NAS transmission message configured to transmit the SMS which is received by the receiving unit by a preset time period, in a case that the determining subunit determines that the priority of the SMS received by the receiving unit is not higher than the preset priority saved by the saving unit.

10. The device according to claim 7, further comprising:
a transmitting unit, configured to transmit an AP message comprising congestion information of the base station to the network device after the determining unit determines that the received downlink NAS transmission message is configured to transmit the SMS, to request the network device to stop, based on the congestion information, transmitting the downlink NAS transmission message to the base station.

11. The device according to claim 7, further comprising:
an issuing unit, configured to issue a first message comprising congestion information of the base station to UE after the determining unit determines that the received downlink NAS transmission message is configured to transmit the SMS, to indicate the UE to determine, based on the first message, whether to transmit an uplink NAS transmission message comprising the SMS to the base station.

12. A device for processing message overload, comprising a processor and a non-transitory processor-readable medium having processor-executable instructions stored thereon, the processor-executable instructions including a plurality of units, the units including:
    a receiving unit, configured to receive a system message comprising a first message which is transmitted by the base station in a broadcast way when the base station is congested, or receive a Radio Resource Control (RRC) message comprising congestion information of the base station which is transmitted by the based station when the base station is congested; and
    a processing unit, wherein the processing unit comprises a first detecting subunit, a determining subunit, and a first processing subunit, or the processing unit comprises a second detecting subunit and a second processing subunit, wherein
    a first detecting subunit, configured to detect the first parameter in the system message received by the receiving unit;
    a determining subunit, configured to determine, based on a second parameter comprised in the system message, whether an uplink Non-Access Stratum (NAS) transmission message comprising the SMS is allowed to be transmitted, in a case that the first parameter is detected by the first detecting subunit;
    a first processing subunit, configured to stop transmitting the uplink NAS transmission message comprising the SMS to the base station in a case that the determining subunit determines that the uplink NAS transmission message comprising the SMS is not allowed to be transmitted;
    a second detecting subunit, configured to detect the congestion information of the base station in the RRC message after the receiving unit receives the RRC message; and
    a second processing subunit, configured to stop transmitting the uplink NAS transmission message comprising the SMS to the base station or delay transmission of the uplink NAS transmission message comprising the SMS by a preset time period, in a case that the congestion information of the base station is detected by the second detecting subunit.

* * * * *